(12) United States Patent
Bugos et al.

(10) Patent No.: US 9,010,089 B2
(45) Date of Patent: Apr. 21, 2015

(54) REDUCTANT DELIVERY UNIT FOR AUTOMOTIVE SELECTIVE CATALYTIC REDUCTION WITH GASKET ANTI-DEPOSIT SHIELDING STRUCTURE

(75) Inventors: Stephen C. Bugos, Poquoson, VA (US); Michael J. Hornby, Williamsburg, VA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 166 days.

(21) Appl. No.: 13/212,865

(22) Filed: Aug. 18, 2011

(65) Prior Publication Data

US 2013/0042598 A1 Feb. 21, 2013

(51) Int. Cl.
  *F01N 3/00* (2006.01)
  *F01N 3/20* (2006.01)
  *F01N 13/18* (2010.01)

(52) U.S. Cl.
  CPC .......... *F01N 3/2066* (2013.01); *F01N 13/1827* (2013.01); *F01N 2610/02* (2013.01); *F01N 2610/1453* (2013.01); *Y02T 10/24* (2013.01)

(58) Field of Classification Search
  USPC ..................................... 60/274–324; 277/502
  See application file for complete search history.

(56) References Cited

U.S. PATENT DOCUMENTS

| | | | | |
|---|---|---|---|---|
| 3,167,324 A * | 1/1965 | Kratochvil | ..................... | 277/601 |
| 4,094,520 A * | 6/1978 | Ng et al. | ........................ | 277/609 |
| 4,607,851 A * | 8/1986 | Usher | ............................ | 264/258 |
| 4,982,716 A * | 1/1991 | Takeda et al. | ................. | 123/531 |
| 5,241,938 A * | 9/1993 | Takagi et al. | ................. | 123/472 |
| 5,558,344 A * | 9/1996 | Kestly et al. | ................. | 277/608 |
| 7,198,303 B2 * | 4/2007 | Brophy et al. | ................. | 285/267 |
| 7,603,849 B2 * | 10/2009 | Hanitzsch et al. | ............. | 60/286 |
| 7,614,213 B2 * | 11/2009 | Hirata et al. | .................. | 60/286 |
| 8,024,922 B2 * | 9/2011 | van Vuuren et al. | ........... | 60/286 |
| 8,191,356 B2 * | 6/2012 | Pollitt et al. | ................... | 60/286 |
| 8,328,203 B2 * | 12/2012 | Kullen et al. | ................. | 277/608 |
| 8,495,986 B2 * | 7/2013 | Reba | ............................. | 123/470 |
| 2008/0105841 A1 * | 5/2008 | Hornby et al. | ........... | 251/129.01 |
| 2009/0158722 A1 * | 6/2009 | Kojima et al. | .................. | 60/297 |

(Continued)

FOREIGN PATENT DOCUMENTS

DE   102005061145 A1   6/2007
DE   WO2008/037330   *   4/2008   ............. F16L 23/20

(Continued)

OTHER PUBLICATIONS

PCT Search Report & Written Opinion in PCT/US2012/051050 dated Nov. 20, 2012.

*Primary Examiner* — Jesse Bogue

(57) ABSTRACT

A reductant delivery unit (10) includes a fluid injector (12) and a flange (20) coupled with the fluid injector. An exhaust boss (28) has a surface (39) defining a through-hole (40) that communicates with a vehicle's exhaust flow path. The flange is coupled to a mounting surface such that the outlet of the fluid injector communicates with the exhaust flow path so as to control injection of urea solution into the exhaust gas flow path. A gasket (32) is sandwiched between the flange and the mounting surface. The gasket has a surface (37) defining a through-hole (38) therein that communicates with the through-hole in the exhaust boss to permit the urea solution to pass from the fluid outlet to the exhaust flow path. Gasket shielding structure (44) covers the surface defining the through-hole in the gasket to prevent the urea solution from contacting the gasket.

19 Claims, 2 Drawing Sheets

(56) References Cited

U.S. PATENT DOCUMENTS

| | | |
|---|---|---|
| 2009/0235650 A1* | 9/2009 | Pollitt et al. .................... 60/295 |
| 2010/0058765 A1* | 3/2010 | Duval et al. .................... 60/740 |
| 2010/0170233 A1* | 7/2010 | Tangemann et al. ............ 60/299 |
| 2010/0253451 A1* | 10/2010 | Watanabe .................... 333/254 |
| 2012/0174561 A1* | 7/2012 | Troxler et al. .................. 60/274 |

FOREIGN PATENT DOCUMENTS

| | | |
|---|---|---|
| DE | 102006061730 A1 | 7/2008 |
| EP | 1662108 A1 | 5/2006 |

\* cited by examiner

REDUCTANT DELIVERY UNIT FOR AUTOMOTIVE SELECTIVE CATALYTIC REDUCTION WITH GASKET ANTI-DEPOSIT SHIELDING STRUCTURE

FIELD OF THE INVENTION

The invention relates to a reductant delivery unit (RDU) that supplies reductant to an engine exhaust system and, more particularly, to a shield associated with a gasket, between an RDU and an exhaust boss, to minimize insoluble urea solution deposits on the gasket.

BACKGROUND OF THE INVENTION

The advent of a new round of stringent emissions legislation in Europe and North America is driving the implementation of new exhaust after-treatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide (NOx) emissions that are difficult to treat in oxygen-rich exhaust environments characteristic of lean-burn combustion. Exhaust after-treatment technologies are currently being developed that will treat NOx under these conditions. One of these technologies comprises a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR).

Ammonia is difficult to handle in its pure form in the automotive environment. Therefore, it is customary with these systems to use a liquid aqueous urea solution, typically at a 32% concentration of urea solution (CO $(NH_2)_2$). The solution is referred to as AUS-32, and is also known under its commercial name of AdBlue. The urea solution is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide (CO2). The ammonia resulting from the thermolysis and the hydrolysis then undergoes a catalyzed reaction with the nitrogen oxides as described previously.

At high temperatures, AUS-32 or AdBlue can decompose into other chemical compounds, including, but not limited to, biuret, melamine, and others. These compounds can exhibit properties of a hard, clay-like substance that is not soluble in water. Below a certain threshold temperature, these deposits can build up to the point of obstructing the injected urea solution spray, resulting in a malfunction of the exhaust after-treatment system.

A conventional RDU is mounted on the exhaust manifold with two mounting screws. The mounting boss on the exhaust manifold receives the RDU, with a gasket between the injector flange and the boss mating surfaces. The gasket material currently used is non-asbestos fiber. Testing has shown that under certain conditions, urea solution decomposition by-products will form on the surfaces defining the gasket through-hole. Once these gasket deposits form, they tend to "grow", forming a buildup that extends to the exhaust boss through-hole surfaces and then beyond into the exhaust space. In some cases, these deposit growths may progress to obstruct the through-hole entirely.

Thus, there is also a need to provide a shield associated with a gasket of an RDU/exhaust boss interface that minimizes the build-up of urea solution deposits on the gasket.

SUMMARY OF THE INVENTION

An object of the invention is to fulfill the need referred to above. In accordance with the principles of the present invention, this objective is obtained by providing a reductant delivery unit for selective catalytic reduction (SCR) after-treatment for vehicles in combination with an exhaust boss. The combination includes a reductant delivery having a fluid injector having an inlet and an outlet, with the inlet being constructed and arranged to receive a source of urea solution. A flange is coupled with the fluid injector. An exhaust boss has a surface defining a through-hole constructed and arranged to communicate with a vehicle's exhaust flow path. The flange is coupled to a mounting surface of the exhaust boss such that the outlet of the fluid injector communicates with the exhaust flow path so as to control injection of urea solution into the exhaust gas flow path. A gasket is sandwiched between the flange and the mounting surface of the exhaust boss. The gasket has a surface defining a through-hole therein that communicates with the through-hole in the exhaust boss to permit the urea solution to pass from the outlet to the exhaust flow path. Gasket shielding structure covers the surface defining the through-hole in the gasket to prevent the urea solution from contacting the gasket.

In accordance with another aspect of a disclosed embodiment, a method prevents urea solution deposit build-up on a gasket disposed between a reductant delivery unit and an exhaust boss of selective catalytic reduction after-treatment system for vehicles. The method provides a gasket sandwiched between a mounting surface of an exhaust boss and a flange of a reductant delivery unit (RDU). The gasket has a surface defining a through-hole therein. The exhaust boss has a surface defining a through-hole communicating with a vehicle's exhaust flow path and in communication with the through-hole in the gasket. The method provides gasket shielding structure over the surface defining the through-hole in the gasket to prevent urea solution, sprayed from the RDU and into the exhaust flow path, from contacting the gasket.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
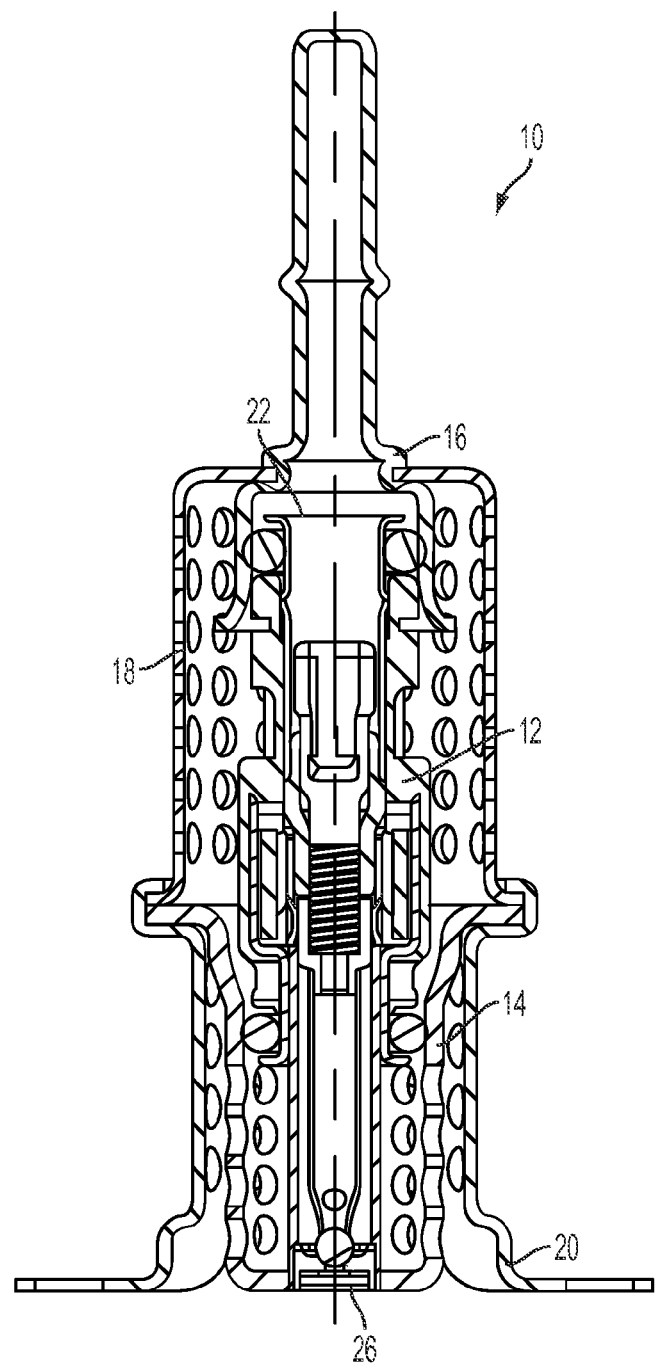
FIG. 1 is a view of an RDU provided in accordance with an embodiment.

With reference to FIG. 1, an RDU is shown, generally indicated at 10, in accordance with an embodiment of the invention. The RDU 10 can be employed in a diesel dosing system of the type disclosed in U.S. Pat. No. 7,721,533, the contents of which is hereby incorporated by reference into this specification.

The RDU 10 includes a solenoid fluid injector 12 that provides a metering function of fluid and provides the spray preparation of the fluid into the exhaust path of a vehicle in a dosing application. Thus, the fluid injector 12 is constructed and arranged to be associated with an exhaust gas flow path upstream of a SCR catalytic converter. The fluid injector 12 is preferably a gasoline, electrically operated, solenoid fuel injector such as the type disclosed in U.S. Pat. No. 6,685,112, the content of which is hereby incorporated by reference into this specification.

The fluid injector 12 is welded to an interior carrier 14. An inlet cup structure 16 is fixed to a shield 18. These two assemblies are crimped together by folding down tangs of the injector flange 20 over shelf features of the carrier 14 and shield 18. As a result, the entire assembly is fixed together, within the strength constraints of the crimp and the shield-to-cup structure fixation. The cup structure 16 is in fluid communication with an inlet 22 of the injector 12. A tube 24 of the cup structure 16 is in communication with a source of urea solution (not shown) that is fed to the injector 12 to be injected from an outlet 26 of the injector 12.

Figure 2:
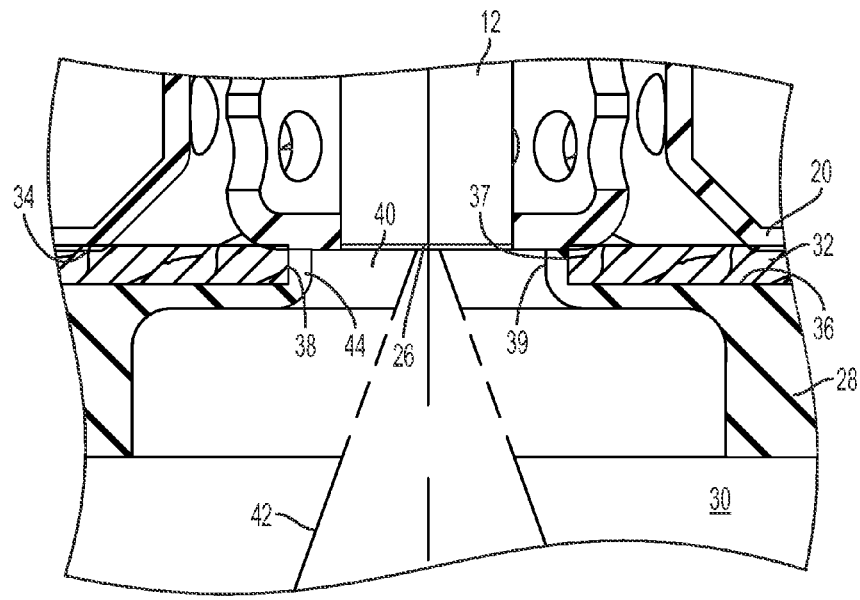
FIG. 2 is a view of a lower portion of the RDU of FIG. 1 shown mounted to an exhaust boss and having gasket shielding structure in accordance with an embodiment.

FIG. 2 shows the injector flange 20 mounted to an metallic exhaust boss 28 that is in communication with a vehicle's exhaust flow path 30 (e.g., exhaust manifold). A non-asbestos fiber sealing gasket 32 is sandwiched between a lower surface 34 of the flange 20 and an upper mounting surface 36 of the exhaust boss 28. The gasket 32 includes an annular surface 37 defining a through-hole 38 and the exhaust boss 28 has an annular surface 39 defining a through-hole 40 in communication with through-hole 38 to permit urea solution 42 to be sprayed from the outlet 26 of the injector 12 into the exhaust flow path 30.

To cover the surface 37 defining the through-hole 38 in the gasket 32 preventing impingement of urea solution spray 42 on the gasket 32 and thus preventing the build-up of deposits, gasket shielding structure is provided directly adjacent to the surface 37 defining the through-hole 38 in the gasket 32. In the embodiment of FIG. 2, the gasket shielding structure is defined by an annular, raised protrusion 44 integral with the exhaust boss 28. Thus, the protrusion 44 extends generally transversely with respect to the upper mounting surface 36 of the exhaust boss 28 to cover the surfaces defining the through-hole 38 in the gasket 32. In this embodiment, the protrusion 44 defines the annular surface 39 defining the through-hole in the exhaust boss 28.

Figure 3:
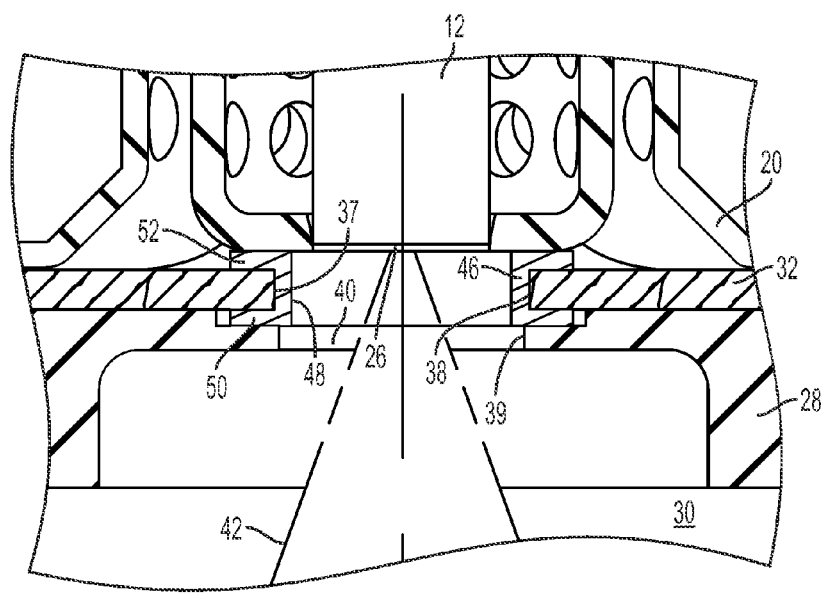
FIG. 3 is a view of a lower portion of the RDU of FIG. 1 shown mounted to an exhaust boss and having gasket shielding structure in accordance with another embodiment.

Alternatively, with reference to FIG. 3, instead of providing the gasket shielding structure on the boss 28, the gasket shielding structure can be a separate component such as a metal eyelet 46 received in the through-hole 38 of the gasket 32 and then securely attached to the gasket 32 such as, by a crimp connection. The eyelet 46 has a through-hole 48 communicating with the through-holes 38 and 40 to permit the urea solution spray 42 into the exhaust flow path 30. The eyelet 46 thus covers the surface 37 defining the through-hole 38 in the gasket to prevent urea solution contact. In the embodiment, the eyelet 46 has opposing legs 50, 52 that are crimped to opposing sides of the gasket 32.

It can be appreciated that the protrusion 44 or eyelet 46 may need some supplementary conditioning such as polishing, or a non-adhesive surface treatment to further enhance the deposit elimination performance of the system.

Thus, the gasket shielding structure 44 or 46 provides an effective way of preventing urea solution from contacting the gasket and thus prevents the build-up of deposits on the gasket 32.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A reductant delivery unit for selective catalytic reduction (SCR) after-treatment for vehicles in combination with an exhaust boss, the combination comprising:
    a reductant delivery unit comprising:
        a fluid injector having an inlet and an outlet, the inlet being constructed and arranged to receive a source of urea solution, and
        a flange coupled with the fluid injector,
    an exhaust boss separate from the flange and having a surface defining a through-hole constructed and arranged to communicate with a vehicle's exhaust flow path, the flange being coupled to a planar mounting surface of the exhaust boss such that the outlet of the fluid injector communicates with the exhaust flow path so as to control injection of urea solution into the exhaust gas flow path,
    a gasket sandwiched between the flange and the planar mounting surface of the exhaust boss, the gasket having a surface defining a through-hole therein that communicates with the through-hole in the exhaust boss to permit the urea solution to pass from the outlet to the exhaust flow path, with the outlet of the fluid injector being upstream of the through-holes, and
    gasket shielding structure separate from the flange and engaged with and covering the surface defining the through-hole in the gasket so that the urea solution may contact the gasket shielding structure, with the gasket shielding structure preventing the urea solution from contacting the gasket.

2. The combination of claim 1, wherein gasket shielding structure comprises an annular protrusion associated with the exhaust boss.

3. The combination of claim 2, wherein the protrusion extends generally transversely with respect to the mounting surface of the exhaust boss.

4. The combination of claim 3, wherein the protrusion is part of the exhaust boss and defines the surface defining the through-hole in the exhaust boss.

5. The combination of claim 1, wherein the gasket shielding structure comprises a metal eyelet having a portion received in the though-hole of the gasket.

6. The combination of claim 5, wherein the eyelet is secured to the gasket by a crimp connection.

7. A reductant delivery unit for selective catalytic reduction (SCR) after-treatment for vehicles in combination with an exhaust boss, the combination comprising:
    a reductant delivery unit comprising:
        a fluid injector having an inlet and an outlet, the inlet being constructed and arranged to receive a source of urea solution, and
        a flange coupled with the fluid injector, an exhaust boss separate from the flange and having a surface defining a through-hole constructed and arranged to communicate with a vehicle's exhaust flow path, the flange being coupled to a planar mounting surface of the exhaust boss such that the outlet of the fluid injector communicates with the exhaust flow path so as to control injection of urea solution into the exhaust gas flow path, means for sealing, sandwiched between the flange and the planar mounting surface of the exhaust boss, the means for sealing having a surface defining a through-hole therein that communicates with the through-hole in the exhaust boss to permit the urea solution to pass from the outlet to the exhaust flow path, with the outlet of the fluid injector being upstream of the through-holes, and means for shielding, separate from the flange and engaged with and covering the surface defining the through-hole in the means for sealing so that the urea solution may contact the means for shielding, with the means for shielding preventing the urea solution from contacting the means for sealing.

8. The combination of claim 7, wherein means for sealing is a gasket.

9. The combination of claim 7, means for shielding comprises an annular protrusion associated with the exhaust boss.

10. The combination of claim 9, wherein the protrusion extends generally transversely with respect to the mounting surface of the exhaust boss.

11. The combination of claim 10, wherein the protrusion is part of the exhaust boss and defines the surface defining the through-hole in the exhaust boss.

12. The combination of claim 7, wherein the means for shielding comprises a metal eyelet having a portion received in the though-hole of the means for sealing.

13. The combination of claim 12, wherein the eyelet is secured to the gasket by a crimp connection.

14. A method of preventing urea solution deposit build-up on a gasket disposed between a reductant delivery unit and an exhaust boss of selective catalytic reduction after-treatment system for vehicles, the method comprising:

providing a gasket sandwiched between a planar mounting surface of an exhaust boss and a flange of a reductant delivery unit (RDU), the exhaust boss being separate from the flange, the gasket having a surface defining a through-hole therein, the exhaust boss having a surface defining a through-hole in communicating with a vehicle's exhaust flow path and in communication with the through-hole in the gasket, with the outlet of the fluid injector being upstream of the through-holes, and providing gasket shielding structure, which is separate from the flange, to be engaged with and covering the surface defining the through-hole in the gasket so that urea solution sprayed from the RDU and into the exhaust flow path may contact the gasket shielding structure, with the gasket shielding structure preventing the urea solution from contacting the gasket.

15. The method of claim 14, wherein the step of providing the gasket shielding structure provides an annular protrusion associated with the exhaust boss.

16. The method of claim 15, wherein the protrusion extends generally transversely with respect to the mounting surface of the exhaust boss.

17. The method of claim 16, wherein the protrusion is part of the exhaust boss and defines the surface defining the through-hole in the exhaust boss.

18. The method of claim 14, wherein the step of providing the gasket shielding structure provides a metal eyelet having a portion received in the though-hole of the gasket.

19. The method of claim 18, further comprising crimping the eyelet to the gasket to secure the eyelet to the gasket.

* * * * *